United States Patent [19]

Bryan

[11] Patent Number: 5,662,256

[45] Date of Patent: Sep. 2, 1997

[54] BICYCLE RACK

[76] Inventor: Ken John Bryan, Lot 39 Castle Rd., Orchard Hills, New South Wales, 2748, Australia

[21] Appl. No.: 557,114

[22] PCT Filed: Jul. 29, 1993

[86] PCT No.: PCT/AU93/00385

§ 371 Date: Feb. 8, 1996

§ 102(e) Date: Feb. 8, 1996

[87] PCT Pub. No.: WO94/27857

PCT Pub. Date: Dec. 8, 1994

[30] Foreign Application Priority Data

May 25, 1993 [AU] Australia ............................. PL8987

[51] Int. Cl.⁶ ............................... B60R 9/10; A47F 7/00
[52] U.S. Cl. .................... 224/523; 224/506; 224/535; 224/537; 224/924; 224/553; 211/5; 211/18
[58] Field of Search ......................... 224/924, 488, 224/495, 502, 505, 506, 518, 519, 520, 521, 522, 523, 531, 532, 533, 535, 536, 537, 553; 211/5, 17, 18, 21

[56] References Cited

U.S. PATENT DOCUMENTS

| | | | |
|---|---|---|---|
| 4,380,344 | 4/1983 | Abbott | 224/519 |
| 4,394,948 | 7/1983 | Graber | 224/924 |
| 4,856,686 | 8/1989 | Workentine | 224/924 |
| 4,863,082 | 9/1989 | Evans et al. | 224/917.5 |
| 5,078,276 | 1/1992 | Rogge et al. | 211/18 |
| 5,092,503 | 3/1992 | Cocks | 224/519 |
| 5,108,018 | 4/1992 | Spinka . | |
| 5,135,145 | 8/1992 | Hannes et al. . | |
| 5,169,042 | 12/1992 | Ching | 224/924 |
| 5,181,822 | 1/1993 | Allsop et al. . | |
| 5,190,195 | 3/1993 | Fullhart et al. . | |
| 5,195,670 | 3/1993 | Piretti et al. | 224/506 |
| 5,303,857 | 4/1994 | Hewson | 224/924 |

FOREIGN PATENT DOCUMENTS

| | | | |
|---|---|---|---|
| 0181036 | 10/1985 | European Pat. Off. . | |
| 8707609 | 5/1987 | Germany . | |
| 87465 | 9/1936 | Sweden | 224/518 |
| 18896 | 8/1897 | United Kingdom | 211/18 |
| 17996 | 10/1900 | United Kingdom | 211/18 |
| 13671 | 5/1903 | United Kingdom | 211/18 |
| WO91/05693 | 5/1991 | WIPO . | |

Primary Examiner—Henry J. Recla
Assistant Examiner—Gregory M. Vidovich
Attorney, Agent, or Firm—Woodbridge & Associates

[57] ABSTRACT

A bicycle rack (10) may be supported by a base (40) on a tow bar of a vehicle. The bicycle rack (10) includes an upright post (11) having at its upper end a pivotally supported arm (12), which is adapted by way of grooves (20) to support a number of bicycles by engagement with the bicycle top tubes. To retain the bicycles in place, a retaining plate (13) is held against the pivot arm (12) by wing nuts applied to threaded fasteners (19) and a padlock which may pass through a hole (22) and a corresponding hole in the pivot arm (12). A gas strut (18) extends between the post (11) and the pivot arm (12) to aid in its pivoting. A number plate support (23) is pivotally attached to the remote end of the pivot arm (12) and connected to the post (11) by a parallelogram linkage to maintain the number plate in a generally vertical plane regardless of the orientation of the pivot arm (12).

10 Claims, 5 Drawing Sheets

BICYCLE RACK

FIELD OF THE INVENTION

The following invention relates to bicycle racks. More particularly, though not exclusively, the invention relates to a bicycle rack which may be affixed to the wall of a garage, or for example to the tow bar of a vehicle, and to securely retain bicycles.

PRIOR ART

Various means of supporting a bicycle upon a motor vehicle are known. One method is to simply place the bicycle in the trunk of the vehicle, often requiring the bicycle to be at least partially dismantled. Another method is to attach the bicycle by some means to roof racks upon a vehicle's roof or by some other means to the rear of the vehicle. Such means of attaching bicycles to the roof or rear of the vehicle include minimal if any security measures to prevent or deter theft of the bicycle(s).

OBJECT OF THE INVENTION

It is the object of the present invention to overcome or substantially ameliorate at least one of the abovementioned disadvantages and/or more generally to provide an improved bicycle rack.

DISCLOSURE OF THE INVENTION

There is disclosed herein a bicycle rack comprising:

an upright post to be secured to an object, an arm pivotably attached to said post and adapted to pivot between a first orientation essentially parallel with said post, and a second orientation essentially normal to said post, means to lock said arm against pivoting in one or more preselected orientations, and retaining means to lockingly retain at least part of a bicycle to said arm, wherein said retaining means comprises a plate adapted to be locked to said arm, said plate comprising a deviation by which a top tube of a bicycle may be secured against said arm.

Preferably, the bicycle rack further comprises a number plate support pivotally attached to a remote end of said arm.

Preferably, the bicycle rack further comprises means to maintain said number plate support in a preselected orientation relative to said post throughout pivoting of said arm.

Preferably, said maintaining means comprises a parallelogram link extending from said post to said number plate support.

Preferably, said arm comprises a groove corresponding to said deviation.

Preferably, there is further provided a gas cylinder extending between said post and said arm.

Preferably, said means to lock comprises at least one locking boss adapted to pass through corresponding apertures in said post and arm, said boss being biased by a spring into said apertures, and being retractable from at least one of said apertures to allow pivoting of said arm relative to said post.

Preferably, said post is pivotally attached to a base, said base being adapted to be supported by a vehicle.

Preferably, said base is pivotally lockably mounted to said post. Alternatively, said base comprises a hole therethrough, said base being supportable by a tow bar and said hole being adapted to receive a tow ball shaft for secure mounting to said tow bar.

Also disclosed herein is a combination comprising the above disclosed bicycle rack and a mounting plate adapted to be secured to a wall, the mounting plate comprises a lug adapted to cooperate so as to support the post and means to lock the post to the mounting plate.

BRIEF DESCRIPTION OF THE DRAWINGS

A preferred form of the present invention will now be described by way of example with reference to the accompanying drawings, wherein.

DESCRIPTION OF THE PREFERRED EMBODIMENTS

Figure 1:
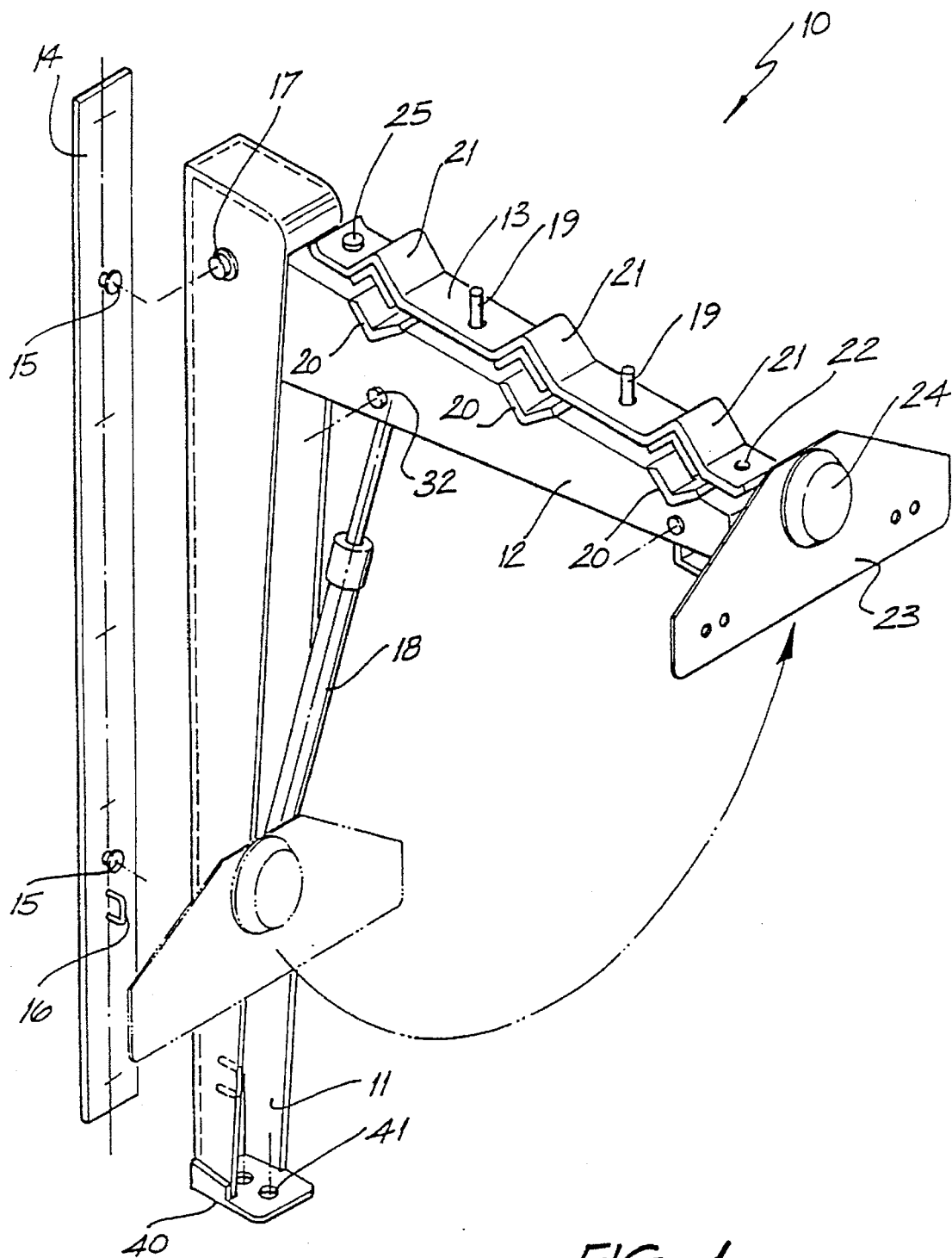
FIG. 1 is a schematic perspective view of a bicycle rack.

In FIG. 1 of the accompanying drawings there is schematically depicted a bicycle rack 10, typically fabricated from mild steel, aluminium or other alloy. Bicycle rack 10 comprises an upright post member 11 comprising a channeled section of C-shape in transverse cross section. At the lower end of post 11, there is provided a base 40 welded thereto and comprising a hole 41 through which the threaded shaft of a tow ball may extend to secure the base 40 to the tow bar of a vehicle. The threaded shaft of the tow ball may be provided with a transverse aperture to receive a padlock. However, such a hole need not be provided or alternatively, any means of securing the two ball to the tow bar may be adopted. For example, a nut securing the threaded shaft to the tow bar may be welded to the threaded shaft and/or two bar.

At the upper end of post member 11 there is pivotally attached by way of pivot shaft 17 a pivot arm 12. Extending between a location part way along pivot arm 12 and a location part way along post 11 is a gas strut 18. Strut 18 is pivotally attached to arm 12 at pivot point 32 for aiding in the pivoting of arm 12.

Figure 2:
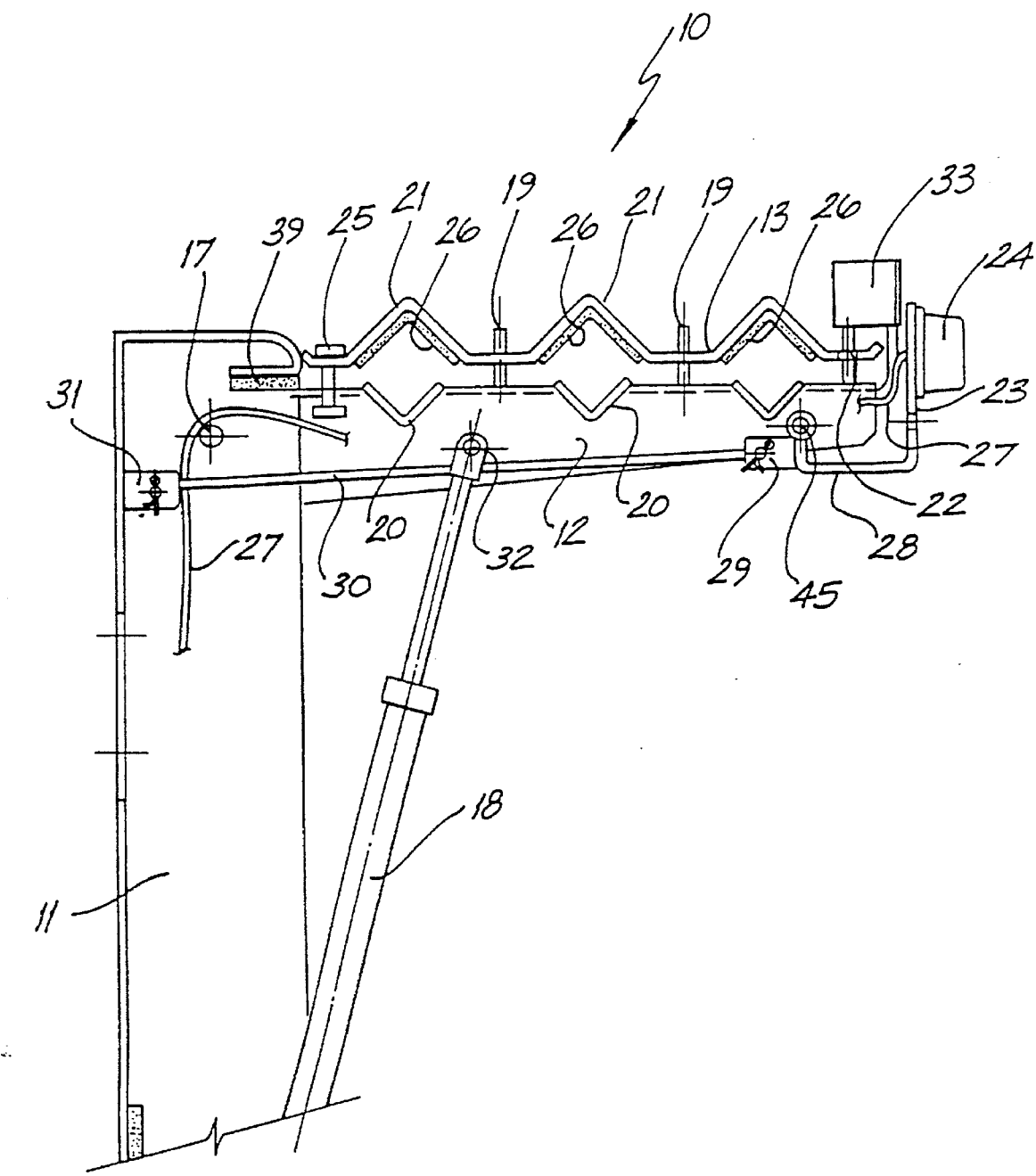
FIG. 2 is a schematic elevational view of the upper portion of the rack of FIG. 1.

The arm 12 is provided with one or more grooves 20 upon which the horizontal upper tube of a bicycle may be placed. Extending upwardly from the arm 12 is a number of threaded fasteners 15 which pass through a retaining plate 13. Wing nuts or ordinary nuts may be placed upon threaded fasteners 19 to firmly secure the retaining plate 13 to the arm 12. At the end of retaining plate 13 proximal to pivot point 17, a lug 25 extends between the retaining plate 13 and arm 12. Lug 25 is long enough to provide a degree of free movement between plate 13 and arm 12 at that end. At the distal end of retaining plate 13 there is provided a hole 22 aligned with a corresponding hole in arm 12. As depicted in FIG. 2, a padlock 33 may pass through the holes to lock the plate 13 onto arm 12. The retaining plate 13 comprises a number of deviations 21 to accommodate the horizontal member of respective bicycles. Beneath each deviation 21 there may be provided padding 26 to prevent scratching of the bicycle. Similar padding may be provided upon each groove 20 on arm 12.

Also at the distal end of arm 12 is a number plate support member 23. Member 23 is pivotally attached at 45 by way of lug 23 to arm 12. Welded or otherwise secured to leg 28 is an attachment point 29 to which a parallelogram link 30 is pivotally attached. Link 30 extends to post 11 where it is also pivotally attached thereto by way of an attachment point 31 welded or otherwise secured to post 11. The purpose of the parallelogram link 30 is to maintain the orientation of number plate support member 23 in a generally vertical orientation throughout the pivoting movement of arm 23. In the raised position depicted in FIG. 1, wherein bicycles may be supported by the rack 10, the number plate would be retained in a position readily visible to anyone behind the vehicle to which the rack is attached. When the arm 12 is pivoted down to a closed configuration, the number plate would remain visible due to its retained vertical orientation.

Figure 3:
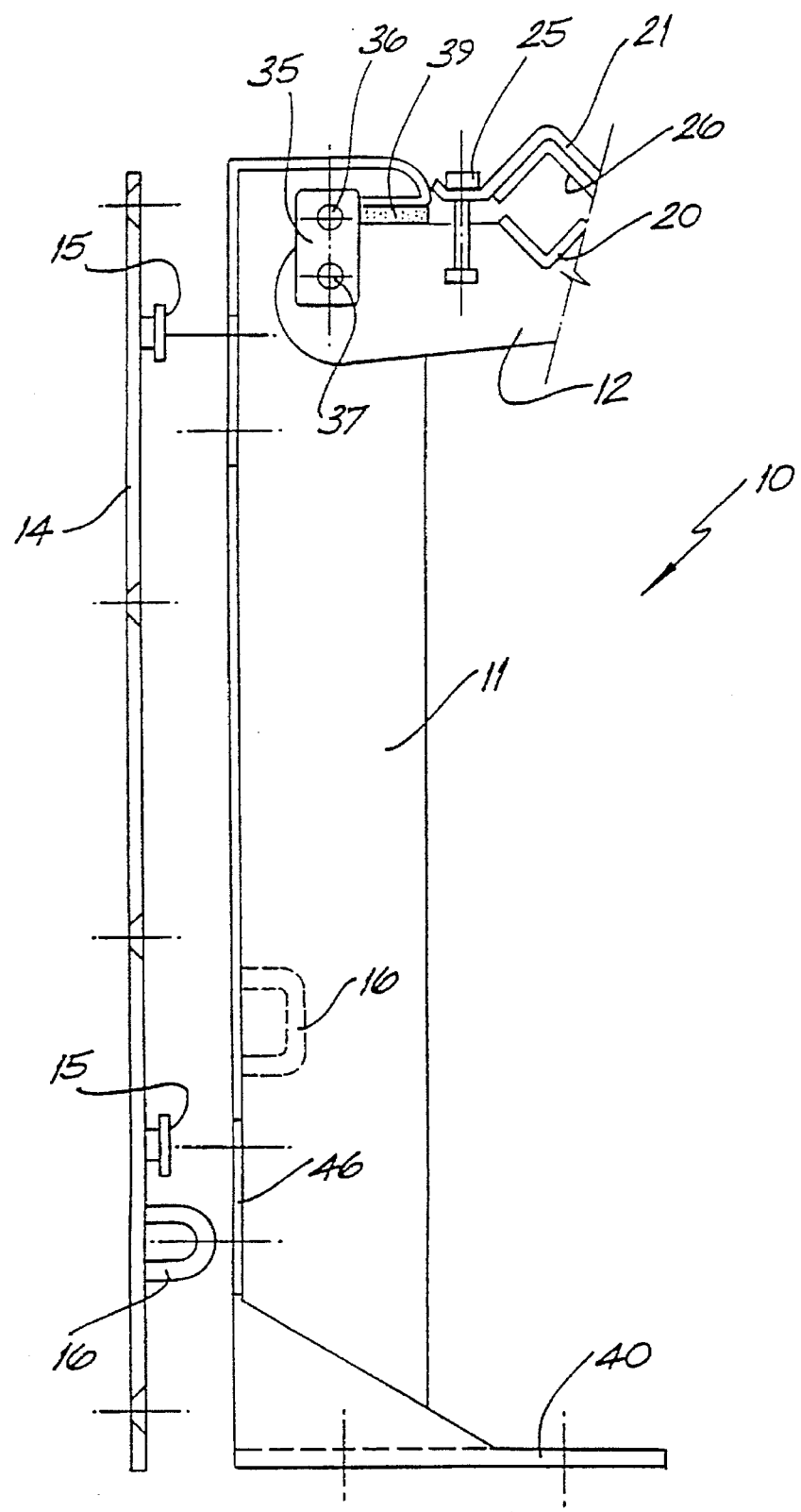
FIG. 3 is a schematic elevational view of part of the rack of FIG. 1.

As depicted in FIGS. 2 and 3, the upper end of post 11 is provided with a resilient buffer 39 against which arm 12 may abut. A brake light 24 may be provided upon number plate support 23. Light 24 might also comprise a glove to illuminate the number plate. Electricity is provided to light 24 by electrical cabling 27 shown in FIG. 2.

Figure 4:
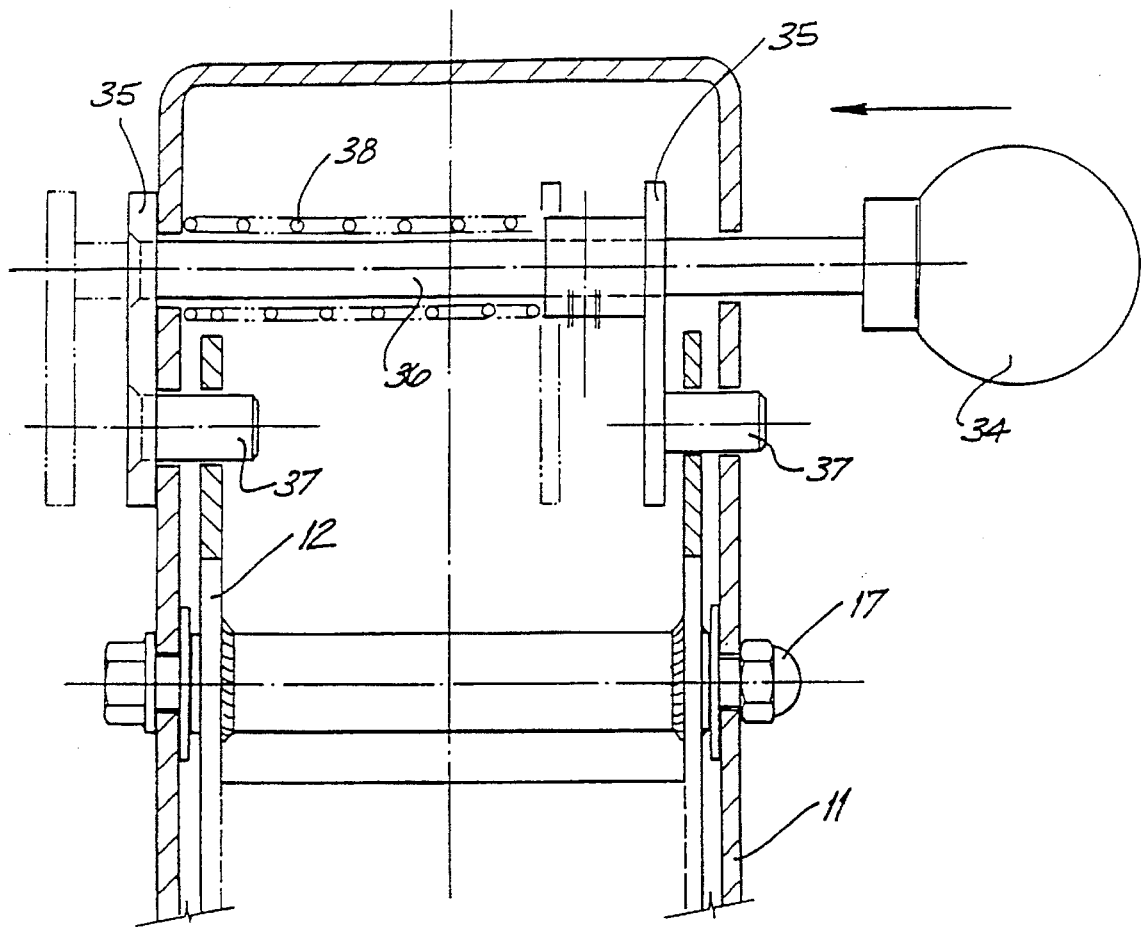
FIG. 4 is a schematic end elevational view of a locking means forming part of the bicycle rack of FIGS. 1, 2 and 3.
Figure 4:
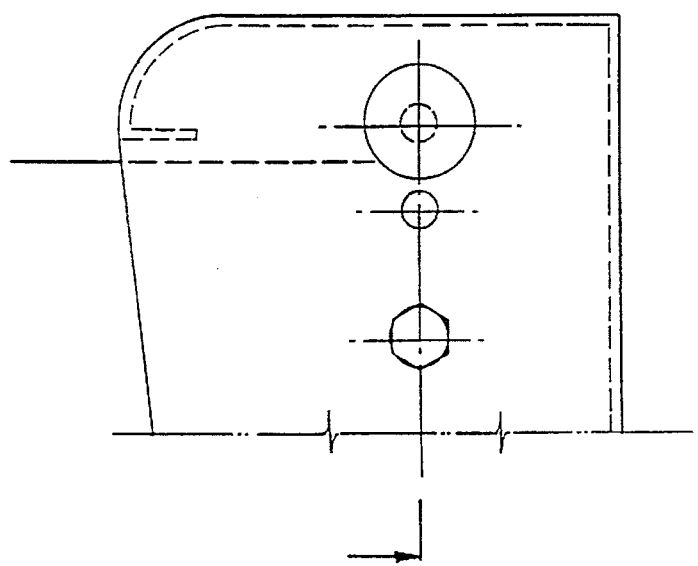

Referring now to FIGS. 3 and 4, a locking device is depicted which is adapted to retain the arm 12 in a selected pivotal orientation. The locking device comprises a shaft 36 extending through aligned apertures in arm 12 and post 11. Fixedly attached to the shaft 36 is a pair of cross pieces 35, each having attached thereto a locking boss 37. Locking boss 37 extends through aligned holes in preselected arcuate positions in arm 12. That is, a pair of holes may be provided in an orientation providing locking of the arm 12 in a collapsed configuration parallel with post 11 whereas a further set of holes may be provided in a position providing locking of the arm 12 in the raised position depicted in FIG. 1 for example. The bosses 37 would be retained in position through aligned holes by compression spring 38. To withdraw the bosses from the holes, a handle 34 is provided.

Also depicted in FIGS. 1 and 3 is a mounting plate 14 which may be secured to a garage wall for example. Mounting plate 14 provides a pair of supporting lugs 15 which may pass through appropriately shaped apertures in the back of post 11. Also provided is a padlock eye 15 which may pass through slot 46 in the back of post 11 and provide a means by which a padlock may be used to secure the post 11 to the wall.

Figure 5:
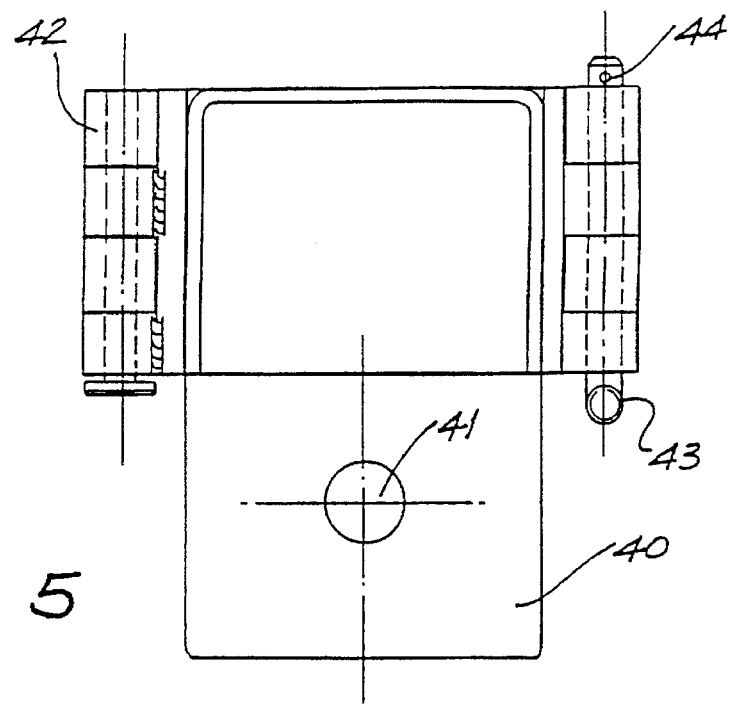
FIG. 5 is a schematic plan view of an alternative base forming part of the bicycle rack of FIG. 1.
Figure 6:
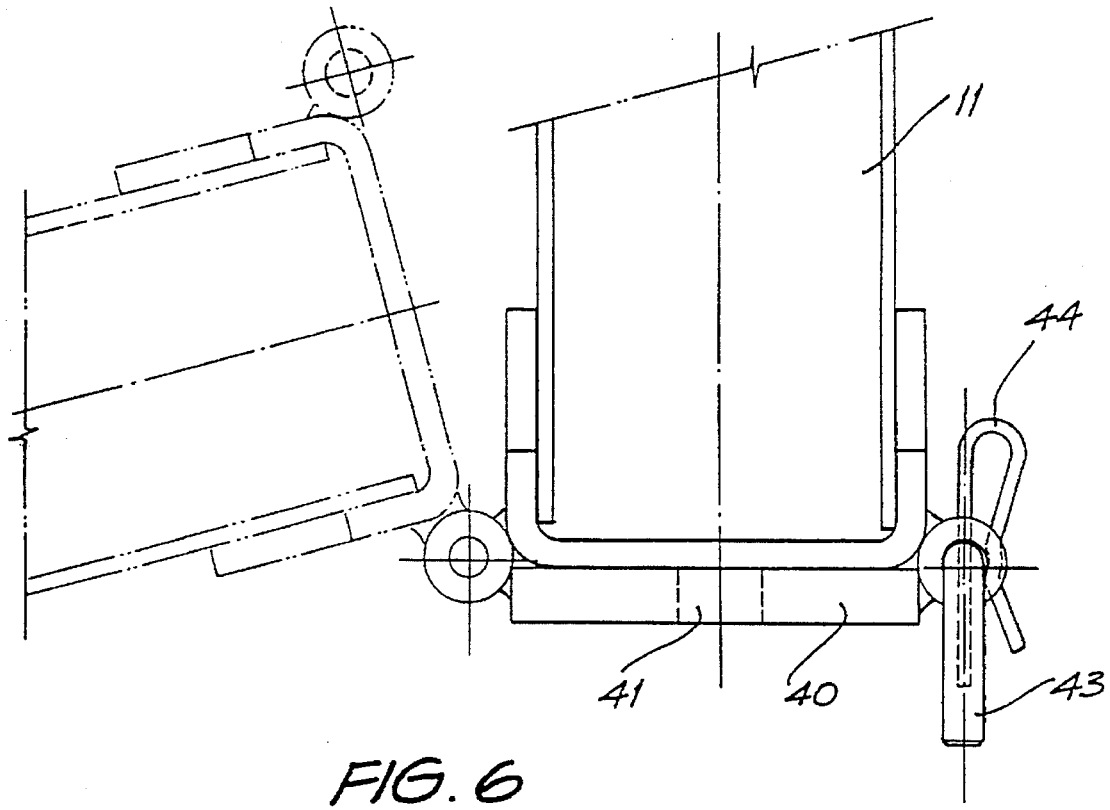
FIG. 6 is a schematic elevational view of the base of FIG. 4 in an open configuration.

Finally, referring to FIGS. 5 and 6, an alternative embodiment base 40 is depicted. This particular embodiment is suitable for application to station wagons or other vehicles where access may be gained to the interior of the vehicle by way of a tail gate or the like. In such instances it would be desirable to pivot the bicycle rack 10 to one side to gain access to the tail gate. To this end the base 40 is provided with a hinge 42 at one side thereof and at the other side thereof with a locking pin arrangement 43. As can be seen, the post 11 may be pivoted to one side or locked in a vertical orientation by locking pin 43. A split pin 44 may prevent accidental removal of locking pin 43.

It should be appreciated that modifications and alterations obvious to those skilled in the art are not to be considered as beyond the scope of the present invention. For example, any alternative means of locking the arm 12 in a desired orientation relative to post 11 may be adapted. Furthermore, any means of maintaining the number plate in an essentially vertical orientation may replace that specifically disclosed.

I claim:

1. A bicycle rack comprising:
   an upright post to be secured to an object,
   an arm pivotably attached to said post and adapted to pivot between a first orientation essentially parallel with said post, and a second orientation essentially normal to said post,
   means to lock said arm against pivoting in one or more preselected orientations,
   retaining means to lockingly retain at least part of a bicycle to said arm, and
   a number plate support pivotally attached to a remote end of said arm.

2. The bicycle rack of claim 1 further comprising means to maintain said number plate support in a preselected orientation relative to said post throughout pivoting of said arm.

3. The bicycle rack of claim 2 wherein said maintaining means comprises a parallelogram link extending from said post to said number plate support.

4. The bicycle rack of claim 1 wherein said arm comprises a groove corresponding to a deviation in said retaining means.

5. The bicycle rack of claim 1 further comprising a gas cylinder extending between said post and said arm.

6. The bicycle rack of claim 1 wherein said means to lock comprises at least one locking boss adapted to pass through corresponding apertures in said post and said arm, said boss being biased by a spring into said apertures, and being retractable from at least one of said apertures to allow pivoting of said arm relative to said post.

7. The bicycle rack of claim 1 wherein said post is attached to a base, the base being attachable to a vehicle.

8. The bicycle rack of claim 7 wherein said post is pivotably lockably mounted to said base.

9. The bicycle rack of claim 7 wherein the base has a hole therethrough, said base being supportable by a tow bar and said hole being adapted to receive a tow ball shaft for secure mounting to said tow bar.

10. In combination, the bicycle rack of claim 1 and a mounting plate adapted to be secured to a wall, the mounting plate comprising a lug adapted to cooperate so as to support the post and means to lock the post to the mounting plate.

* * * * *